(12) United States Patent
Jeon et al.

(10) Patent No.: US 8,121,748 B2
(45) Date of Patent: Feb. 21, 2012

(54) STARTUP SEQUENCE CONTROL METHOD OF FUEL CELL-SUPER CAPACITOR HYBRID ELECTRIC VEHICLE

(75) Inventors: Soon Il Jeon, Gyeonggi-do (KR); Joon Yong Lee, Seoul (KR); Sang Uk Kwon, Gyeonggi-do (KR); Ho Sung Kang, Seoul (KR)

(73) Assignee: Hyundai Motor Company, Seoul (KR)

( * ) Notice: Subject to any disclaimer, the term of this patent is extended or adjusted under 35 U.S.C. 154(b) by 1058 days.

(21) Appl. No.: 12/006,230

(22) Filed: Dec. 31, 2007

(65) Prior Publication Data

US 2009/0112384 A1 Apr. 30, 2009

(30) Foreign Application Priority Data

Oct. 26, 2007 (KR) .......................... 10-2007-0108067

(51) Int. Cl.
*G06F 19/00* (2006.01)
*B60L 11/12* (2006.01)

(52) U.S. Cl. .............................. 701/22; 363/95; 429/430
(58) Field of Classification Search .......................... None
See application file for complete search history.

(56) References Cited

U.S. PATENT DOCUMENTS

| 6,577,026 | B1 | 6/2003 | Faller et al. | |
|---|---|---|---|---|
| 6,815,100 | B2 * | 11/2004 | Aoyagi et al. | 429/429 |
| 7,695,839 | B2 * | 4/2010 | Arthur et al. | 429/431 |
| 7,835,831 | B2 * | 11/2010 | Chung et al. | 701/22 |
| 2006/0127704 | A1 * | 6/2006 | Raiser | 429/9 |
| 2006/0238033 | A1 * | 10/2006 | Raiser et al. | 307/66 |
| 2007/0292724 | A1 * | 12/2007 | Gilchrist | 429/9 |
| 2008/0087479 | A1 * | 4/2008 | Kang | 180/65.3 |

FOREIGN PATENT DOCUMENTS

| JP | 07-264715 | 10/1995 |
|---|---|---|
| JP | 2006-254610 | 9/2006 |
| KR | 102007006075 A | 6/2007 |

OTHER PUBLICATIONS

Jeon, Soo Il, et al. "Hyundai Supercapacitor Fuel Cell Hybrid Electric Vehicle", 7 pages, unknown date.*

* cited by examiner

*Primary Examiner* — Thomas Black
*Assistant Examiner* — Lin B Olsen
(74) *Attorney, Agent, or Firm* — Edwards Wildman Palmer LLP; Peter F. Corless (57) ABSTRACT

The present invention provides a startup sequence control method of fuel cell-super capacitor hybrid electric vehicles, which can protect a fuel cell at the time of the starting of the fuel cell, reduce the start-up time and promote convenience of a driver in a fuel cell-super capacitor serial hybrid system which does not employ a high-voltage power converter. The startup sequence control method comprises the steps of: determining whether or not a low-voltage auxiliary battery is in a state where its voltage is less than a reference voltage or in a cold start condition after a key-on signal has been input; if the auxiliary battery is in the state where its voltage is less than a reference voltage or in the cold start condition, matching the voltage of a main bus terminal to the voltage of an auxiliary power source through the voltage boost of a power converter; turning on a relay for cutting off the voltage of the auxiliary power source and a main relay of a precharge unit for the auxiliary power source; and turning off the power converter and then driving a fuel cell auxiliary component using the auxiliary power source to thereby boost a fuel cell voltage.

7 Claims, 8 Drawing Sheets

STARTUP SEQUENCE CONTROL METHOD OF FUEL CELL-SUPER CAPACITOR HYBRID ELECTRIC VEHICLE

CROSS-REFERENCE TO RELATED APPLICATION

This application claims the benefit under 35 U.S.C. §119 (a) on Korean Patent Application No. 10-2007-0108067 filed on Oct. 26, 2007, the entire contents of which are incorporated herein by reference.

BACKGROUND (a) Technical Field

The present invention relates to a startup sequence control method of fuel cell-super capacitor hybrid electric vehicles. More particularly, the present invention relates to a startup sequence control method of fuel cell-super capacitor hybrid electric vehicles, which can protect a fuel cell at the time of the starting of the fuel cell, reduce the start-up time and promote convenience of a driver in a fuel cell-super capacitor serial hybrid system which does not employ a high-voltage power converter.

(b) Background Art

A conventional fuel cell-battery hybrid electric vehicle allows a high-voltage DC-to-DC converter disposed between the fuel cell and the battery to compensate for a voltage difference between the fuel cell and the battery and perform the control of charge/discharge of the battery as well as the control of power of the fuel cell, thereby eliminating the necessity of a separate start-up control strategy for matching the voltages between the fuel cell and the battery.

Also, a fuel cell-super capacitor hybrid electric vehicle employing the high-voltage DC-to-DC converter does not need a separate start-up control strategy since it performs initial charge of the super capacitor and charge/discharge thereof during the traveling of the of vehicle through an active method using the high-voltage DC-DC converter.

On the other hand, a fuel cell-super capacitor hybrid electric vehicle that does not employ the high-voltage DC-DC converter indispensably requires a separate initial charge device for the super capacitor and a start-up control corresponding to the initial chare unit.

The initial charge device for the super capacitor includes, for example, a device which employs a precharge resistor and a precharge relay and a device which employs an inductor and an insulated gate bipolar transistor (hereinafter, referred to as "IGBT") as a high-power switching semiconductor.

As a related conventional technique, U.S. Pat. No. 6,815,100 B2 discloses a control device for starting a fuel cell vehicle which limits an output current from the fuel cell using a DC-DC chopper prior to direct connection between the fuel cell and the super capacitor whose voltage drops after the driving of fuel cell's auxiliary components and the supply of a motor voltage through a super capacitor at the time of the starting up of the vehicle, thereby preventing an excessive reduction of a terminal voltage of the fuel cell at the time starting the fuel cell.

Korean Patent Laid-Open Publication No. 2006-0003543 discloses a fuel cell-supper capacitor hybrid vehicle and a control method for starting the same, in which electric power of the fuel cell is charged in the super capacitor through a multi-resistor of a precharge unit of the supper capacitor after starting the fuel cell using an auxiliary battery.

In case of the fuel cell-super capacitor serial hybrid system without a power converter, there is a need for a proper control method that can protect the fuel cell at the time of the starting and starting off of the fuel cell, reduce the start-up time and promote convenience of a driver Particularly, in case of a fuel cell-super capacitor hybrid vehicle, a control method is necessarily needed which enables a smooth start even under adverse conditions such as cold start due to lack of available start energy.

In other words, there is a need for a method of properly using the charge energy of a low-voltage battery and a super capacitor depending on the circumstances so as to start the fuel cell, a method of driving auxiliary components of the fuel cell using the output voltage of the fuel cell itself after a boost of the fuel cell voltage, and a method of initially charging a super capacitor after the completion of a fuel cell start.

The information disclosed in this Background section is only for enhancement of understanding of the background of the invention and should not be taken as an acknowledgment or any form of suggestion that this information forms the prior art that is already known to a person skilled in that art.

SUMMARY OF THE DISCLOSURE

The present invention has been made in an effort to solve the above problems occurring in the prior art, and it is an object of the present invention to provide a startup sequence control method of fuel cell-super capacitor hybrid electric vehicles, in which the super capacitor as an auxiliary power source and a low-voltage battery is selectively used at the time of starting the fuel cell, the voltage of the auxiliary power source is boosted using a precharge unit as a buck-type converter after completion of the start-up of the fuel cell, thereby enabling a smooth start-up of the vehicle under various conditions.

In order to accomplish the above object, in one aspect, the present invention provides a startup sequence control method of fuel cell-super capacitor hybrid electric vehicles, the method comprising the steps of: determining whether or not a low-voltage auxiliary battery is in a state where its voltage is less than a reference voltage or in a cold start condition after a key-on signal has been input; if the auxiliary battery is in the state where its voltage is less than a reference voltage or in the cold start condition, matching the voltage of a main bus terminal to the voltage of an auxiliary power source through the voltage boost of a power converter; turning on a relay for cutting off the voltage of the auxiliary power source and a main relay of a precharge unit for the auxiliary power source; and turning off the power converter and then driving a fuel cell auxiliary component using the auxiliary power source to thereby boost a fuel cell voltage.

In a preferred embodiment, the step of driving the fuel cell auxiliary component using the auxiliary power source further comprises the steps of: determining whether the voltage of the auxiliary power source is smaller than or equal to a larger one $V_{LP1}$ of the fuel cell voltage $V_{FC}$ having a level enough to use the power of the auxiliary component from the fuel cell, and a minimum voltage needed to drive the auxiliary component; if the voltage of the auxiliary power source is not smaller than or equal to the larger voltage $V_{LP1}$, matching the voltage of the main bus terminal to the voltage $V_{LP1}$ through the voltage boost of the power converter; and if the fuel cell voltage is greater than or equal to the voltage $V_{LP1}$, turning off the power converter and the main relay.

In a more preferred embodiment, the startup sequence control method further comprises the steps of: if it is determined that the auxiliary battery is in a state where its voltage is more than the reference voltage or is not in the cold start condition, matching the voltage the main bus terminal to $V_{LP1}$ through the voltage boost of the power converter; driving the fuel cell auxiliary component using the auxiliary battery to thereby boost the fuel cell voltage; if the fuel cell voltage is greater than or equal to $V_{LP1}$, turning off the power converter.

In addition, the startup sequence control method further comprises a step of, if the fuel cell voltage is greater than or equal to $V_{LP1}$, releasing the connection between the power converter and the auxiliary power source and then driving the fuel cell auxiliary component using the output voltage of the fuel cell itself.

Preferably, the startup sequence control method further comprises the steps of: charging the auxiliary battery through the buck of the power converter after the completion of the start-up of the fuel cell; switching on the relay installed at a front end of the MCU to prepare the driving of the vehicle; entering a single fuel cell mode and charging the fuel cell to a certain voltage level through the adjustment of the duty cycle of the IGBT prior to the switching on of the main relay for interconnecting the fuel cell and the auxiliary power source in order to perform a precharge operation using the auxiliary power source while driving the vehicle in the single fuel cell mode; determining whether or not the voltage of the fuel cell and the voltage of the auxiliary power source are equal to each other; and if the voltage of the fuel cell and the voltage of the auxiliary power source are equal to each other, switching on the main relay of the precharge unit.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like. The present methods will be particularly useful with a wide variety of vehicles.

Other aspects of the invention are discussed infra.

Reference numerals set forth in the Drawings includes reference to the following elements as further discussed below:

10: fuel cell stack
11: supercap
12: low-voltage power converter (LPC)
13: auxiliary battery
14: high-voltage auxiliary components
15: motor
16: supercap precharge unit
17: MCU RELAY
18: fuel cell relay
19: main relay
20: IGBT
21: supercap cutoff relay
22: MCU
23: VLD

DETAILED DESCRIPTION

Reference will now be made in detail to the preferred embodiment of the present invention, examples of which are illustrated in the drawings attached hereinafter, wherein like reference numerals refer to like elements throughout. The embodiments are described below so as to explain the present invention by referring to the figures.

Figure 1:
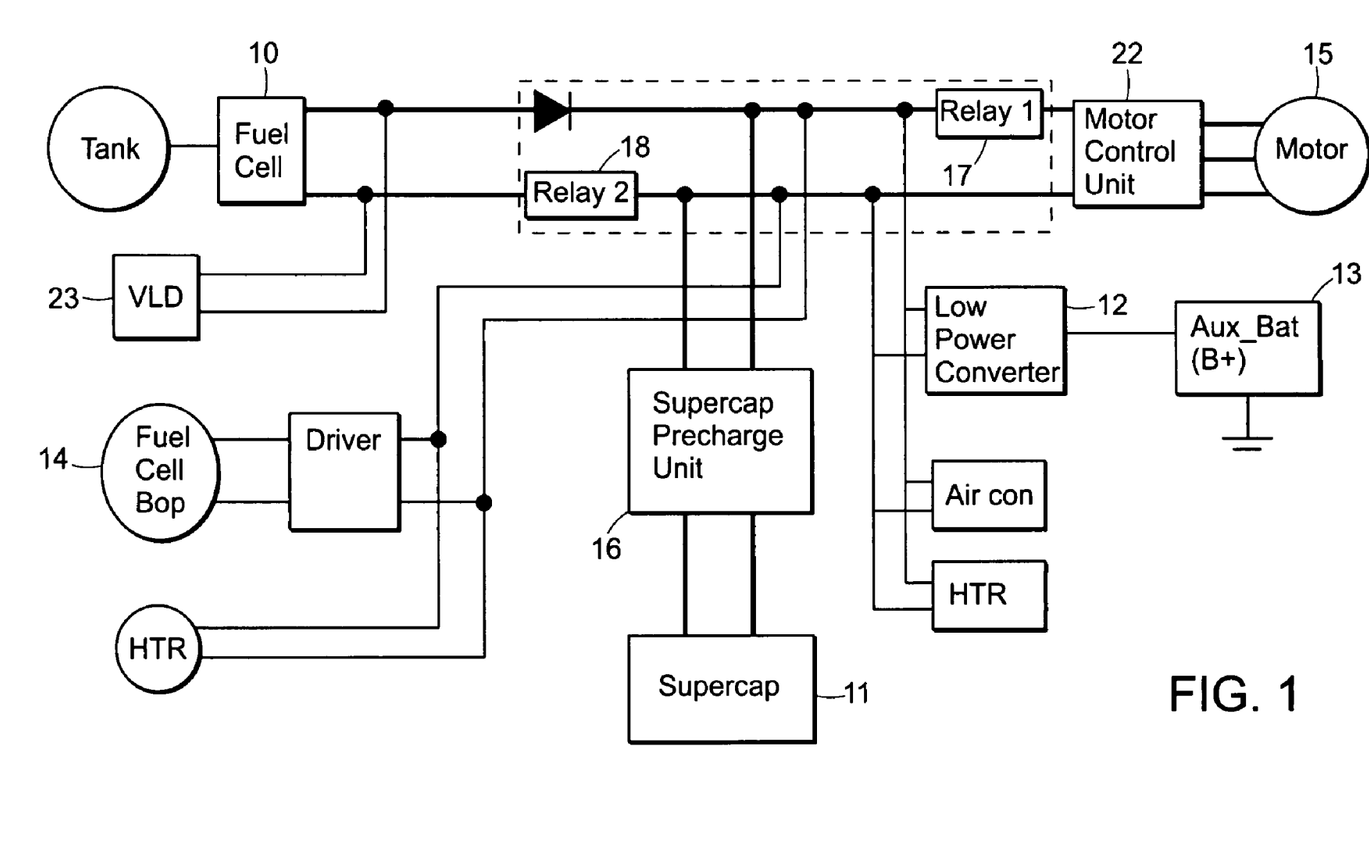
FIG. 1 is a block diagram showing the construction of a power net of a fuel cell-super capacitor hybrid vehicle according to one embodiment of the present invention.

FIG. 1 is a block diagram showing the construction of a power net of fuel cell-super capacitor hybrid vehicle according to one embodiment of the present invention.

As shown in FIG. 1, a power net of a fuel cell-super capacitor hybrid vehicle according to an embodiment of the present invention includes a fuel cell stack 10, an auxiliary power source, a low-voltage power converter (LPC) 12, a 12V auxiliary battery 13. In this case, a super capacitor 11 can be used as the auxiliary power source in this embodiment of the present invention.

A high-voltage auxiliary component 14 including a BOP (Balance of Plant, an air blower, a hydrogen re-circulating blower, a water pump, etc.,) must be operated so as to start the fuel cell stack 10, and the level of the voltage generated from the fuel cell stack 10 and the level of the voltage of the high-voltage auxiliary component 14 are equal to each other. For example, the voltage level ranges from 250 to 450 V.

In addition, since parts employing electric power of the 12V auxiliary battery 13 continuously consume the power during the traveling of the vehicle, the low-voltage power converter 12 is required to charge the 12V auxiliary battery 13.

The low-voltage power converter 12 can be converted bidirectionally. For example, the lower-voltage power converter 12 serves to convert down 400V to 12V through a 400V power line to charge the 12V auxiliary battery during the traveling, and boost a voltage to 400V using a 12V power source at the time of the initial startup to start the fuel cell stack 10.

The motor 15 and the inverter (not shown) are directly connected to the fuel cell stack 10, and the super capacitor 11 is connected to the fuel cell stack through a supercap precharge unit 16 for the purpose of power assist and regenerative braking.

At a main bus terminal is installed various relays 17 and 18 for facilitating interruption and resumption of the supply of power, and a blocking diode for preventing the flow of inverse current to the fuel cell.

Figure 2:
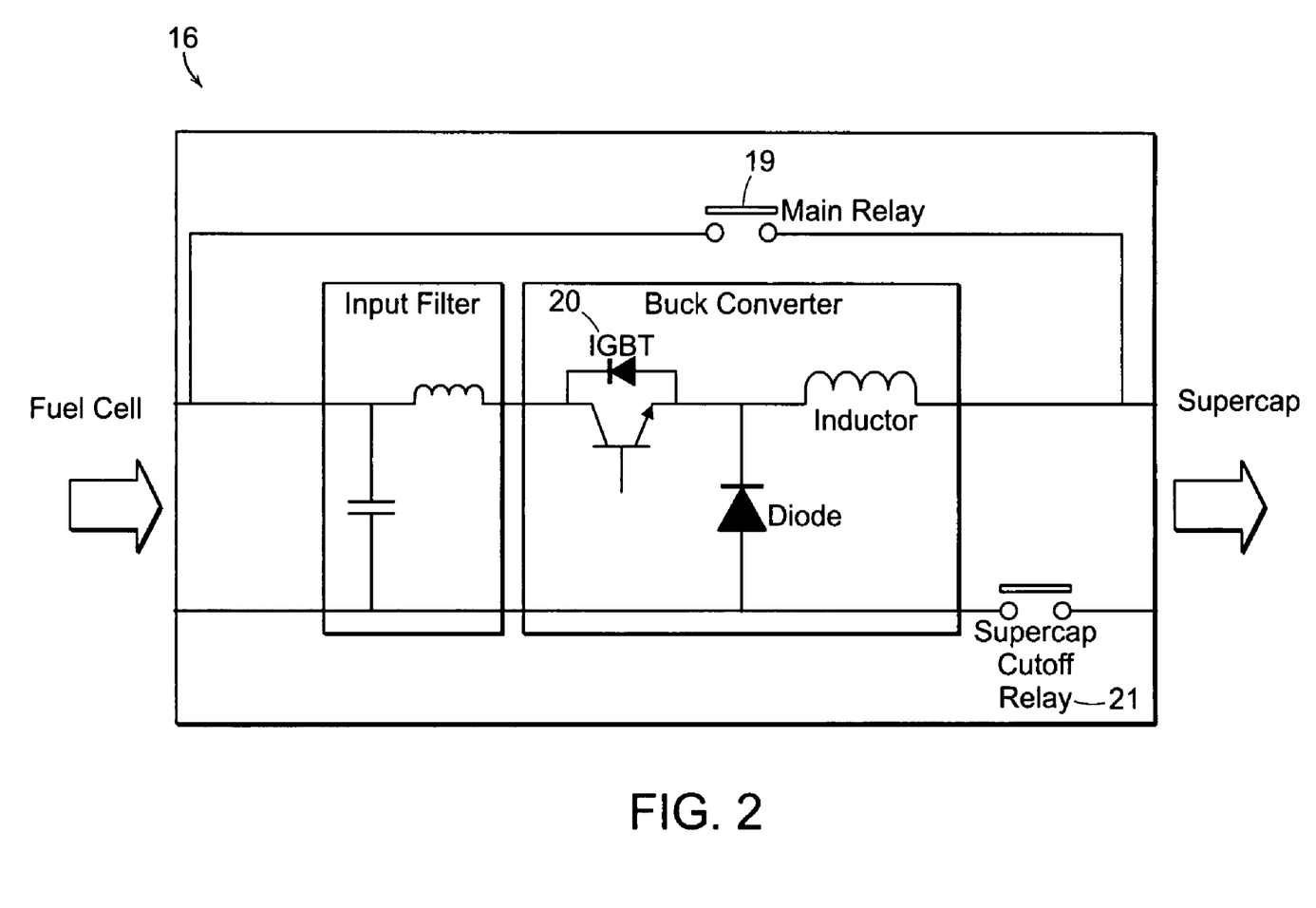
FIG. 2 is a diagram showing a circuit of a super capacitor precharge unit (hereinafter, referred to as "supercap precharge unit") of FIG. 1.

The supercap precharge unit 16 is a buck-type converter, and constitutes a separate electric circuitry together with a main relay 19 between the fuel cell stack 10 and the super capacitor 11. The supercap precharge unit 16 serves to block the sharp flow of current through the adjustment of a duty cycle of the IGBT 20 to thereby prevent undesired adherence of the main relay 19 and charge the super capacitor 11.

When the voltage applied across the fuel cell stack 10 and the super capacitor 11 are substantially equal, the IGBT 20 is stopped to turn on the main relay 19 to cause the supercap precharge unit 16 to be directly connected to the super capacitor 11. A reference numeral 21 denotes a relay (hereinafter, referred to as "supercap cutoff relay") for cutting off the voltage of the super capacitor, and serves to protect an internal capacitor.

FIGS. 3a to 3d are block diagrams showing the construction of the power net for explaining a startup sequence of a fuel cell-super capacitor hybrid vehicle according to an embodiment of the present invention.

Figure 3A:
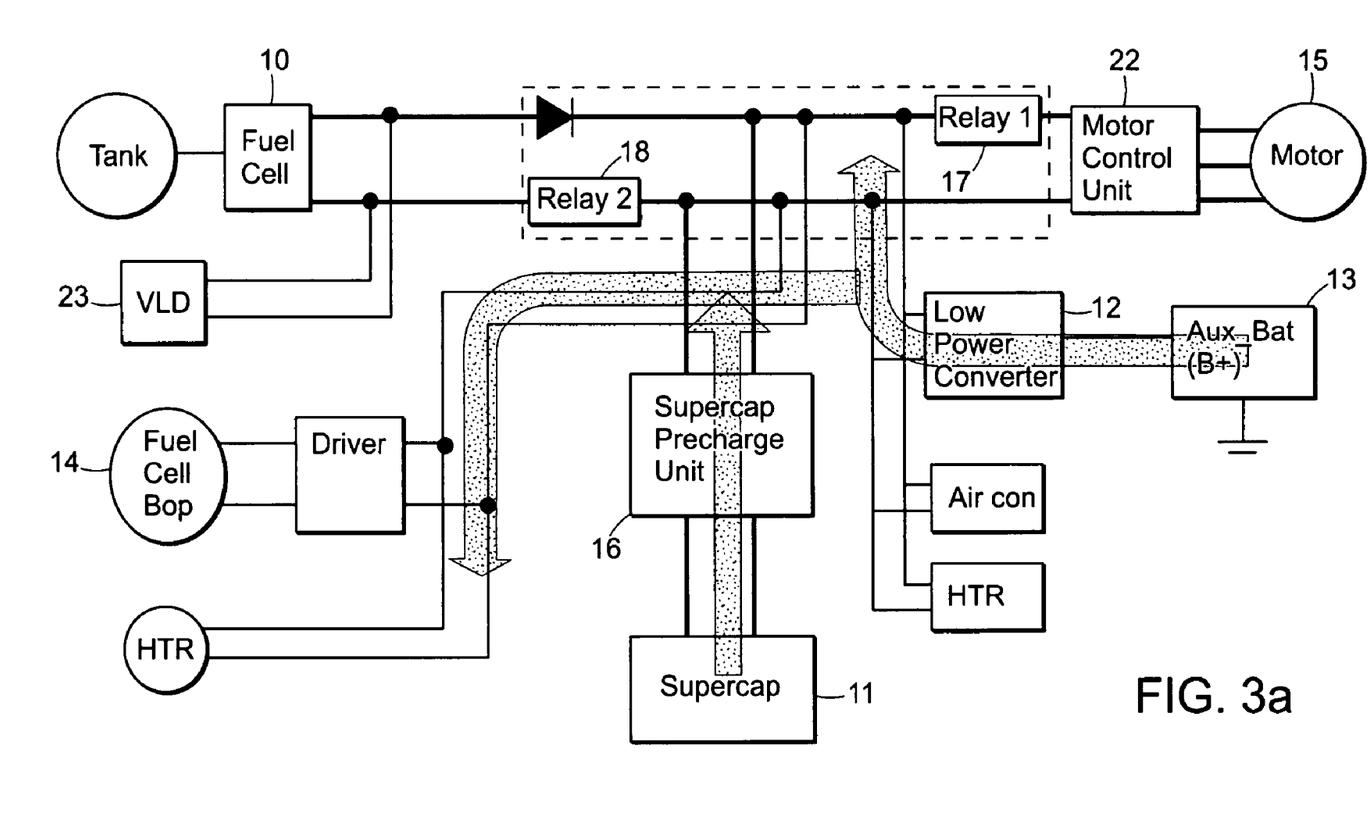
FIGS. 3a to 3d are block diagrams showing the construction of the power net for explaining a startup sequence of FIG. 1.

In FIG. 3a, the auxiliary component 14 used to start the fuel cell is operated using the energy of the auxiliary battery 13 and the super capacitor 11

Figure 3B:
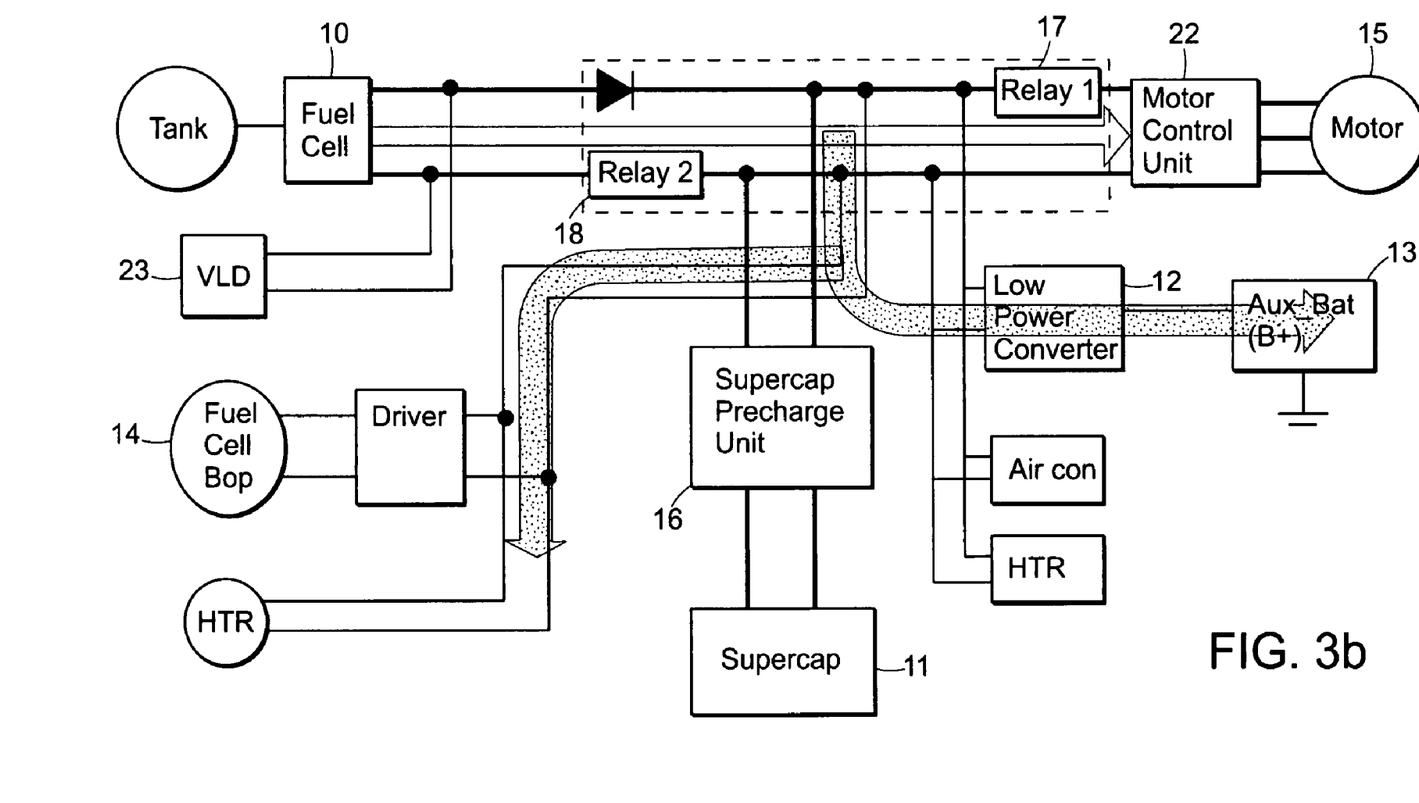

In FIG. 3b, when the voltage of the fuel cell stack 10 is boosted to a certain level, the auxiliary component 14 is operated using an output voltage of the fuel cell itself. At this time, the connection of the fuel cell stack 10 to the super capacitor 11 is released to prevent the charge of the super capacitor 11 and the operation mode of the auxiliary battery 13 is changed to a charge mode.

Figure 3C:
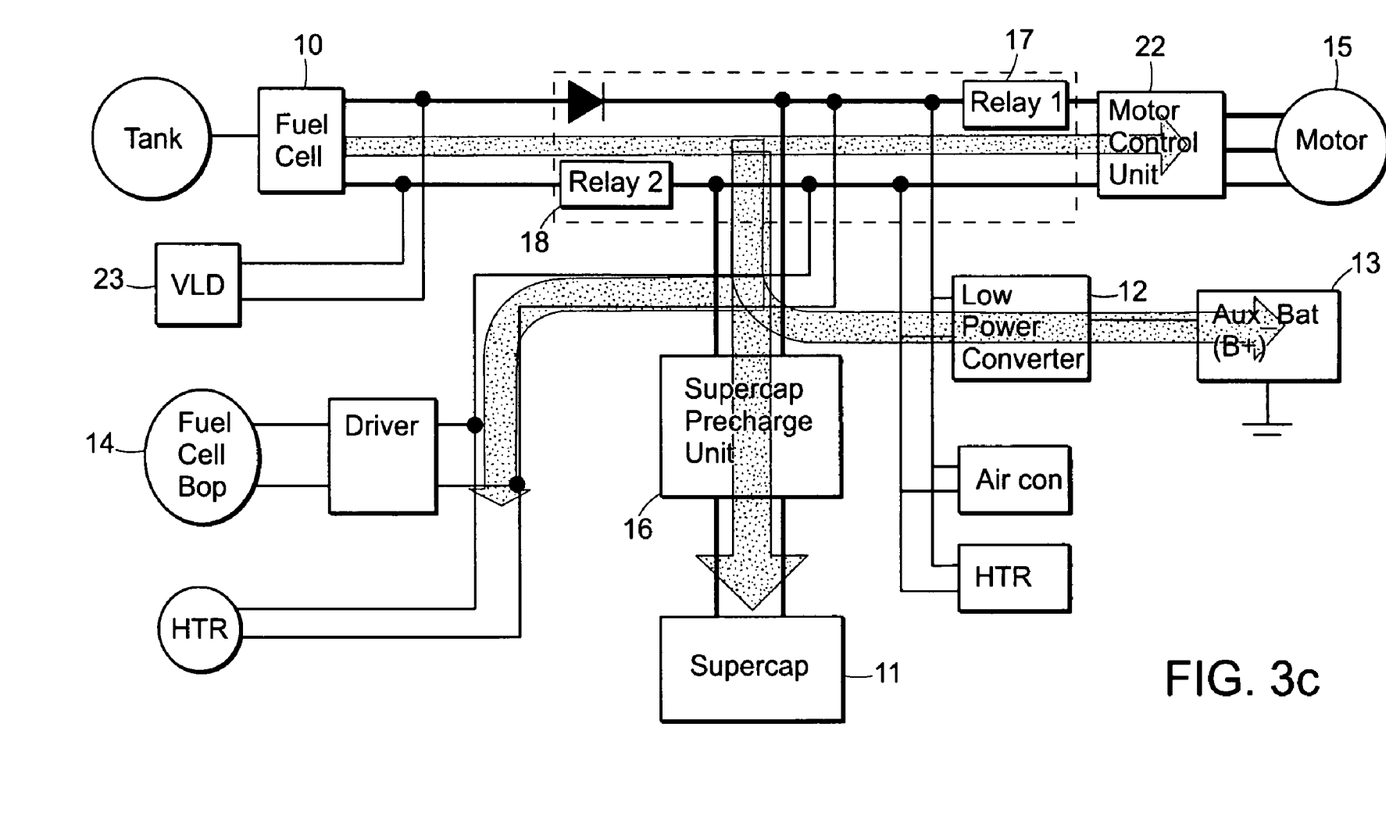

In FIG. 3c, when the start-up of the fuel cell is completed, a first relay 17 installed at a front end of an MCU 22 is operated to drive the vehicle. Simultaneously, the super capacitor 11 begins to be charged through the supercap precharge unit 16 and the auxiliary battery 13 is charged through the LPC 12.

Figure 3D:
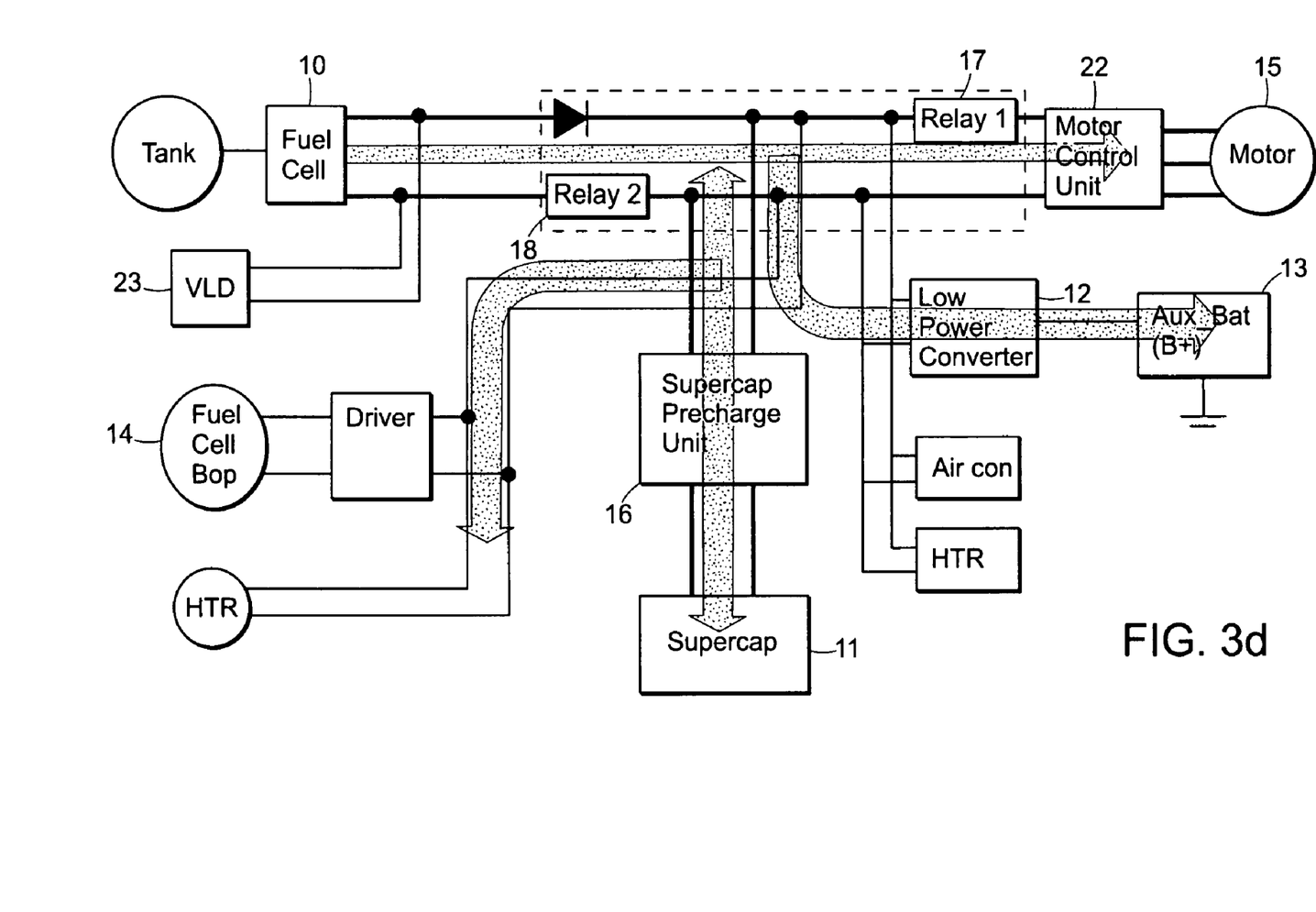

In FIG. 3d, when the charge of the super capacitor 11 is completed through the supercap precharge unit 16, the main relay 19 is operated to cause the fuel cell stack 10 and the super capacitor 11 to be directly be connected to each other, thereby allowing the vehicle to be operated in a hybrid mode.

Figures 4, 4A:
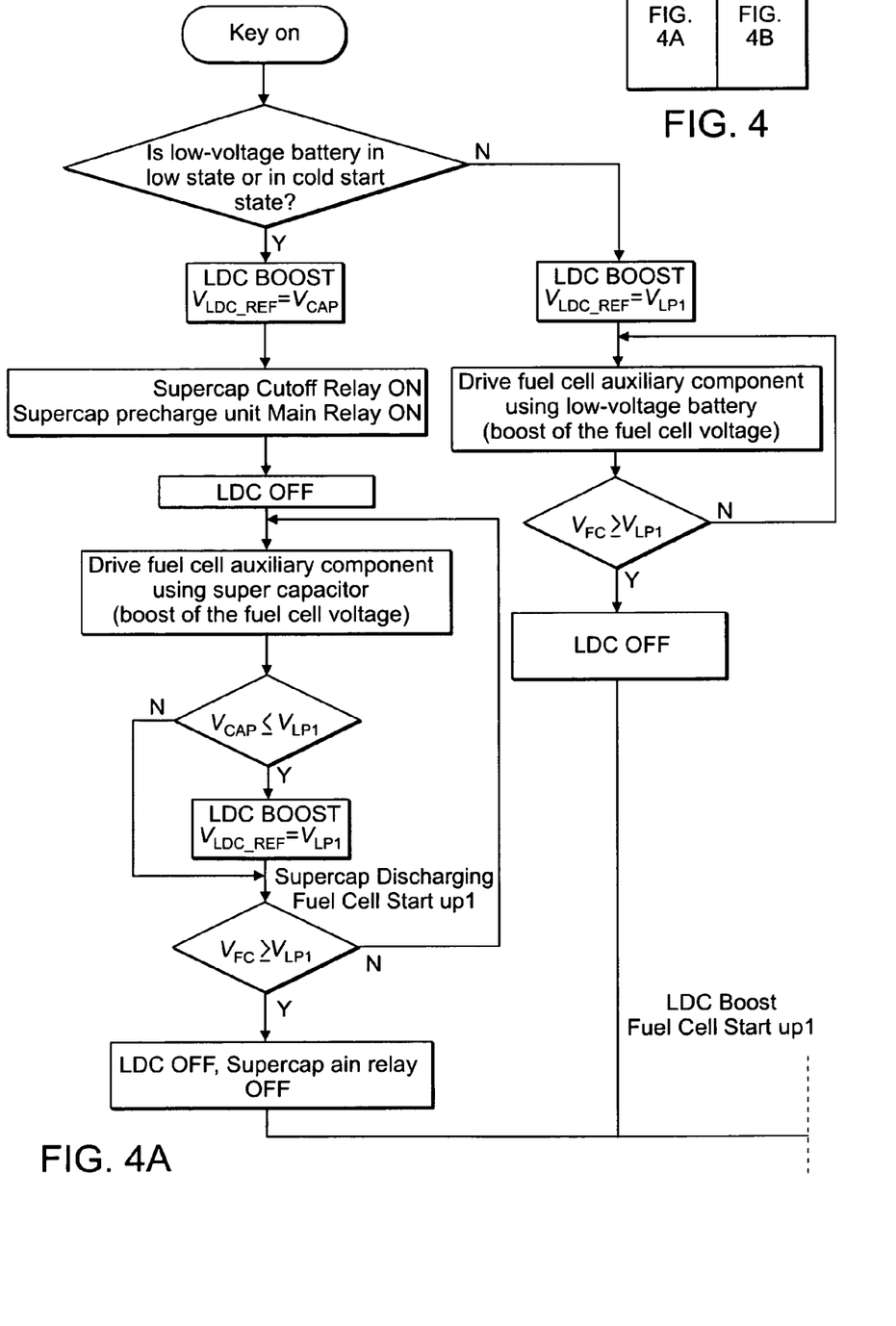
FIG. 4 is a flow chart showing the startup sequence of FIG. 1.
Figure 4B:
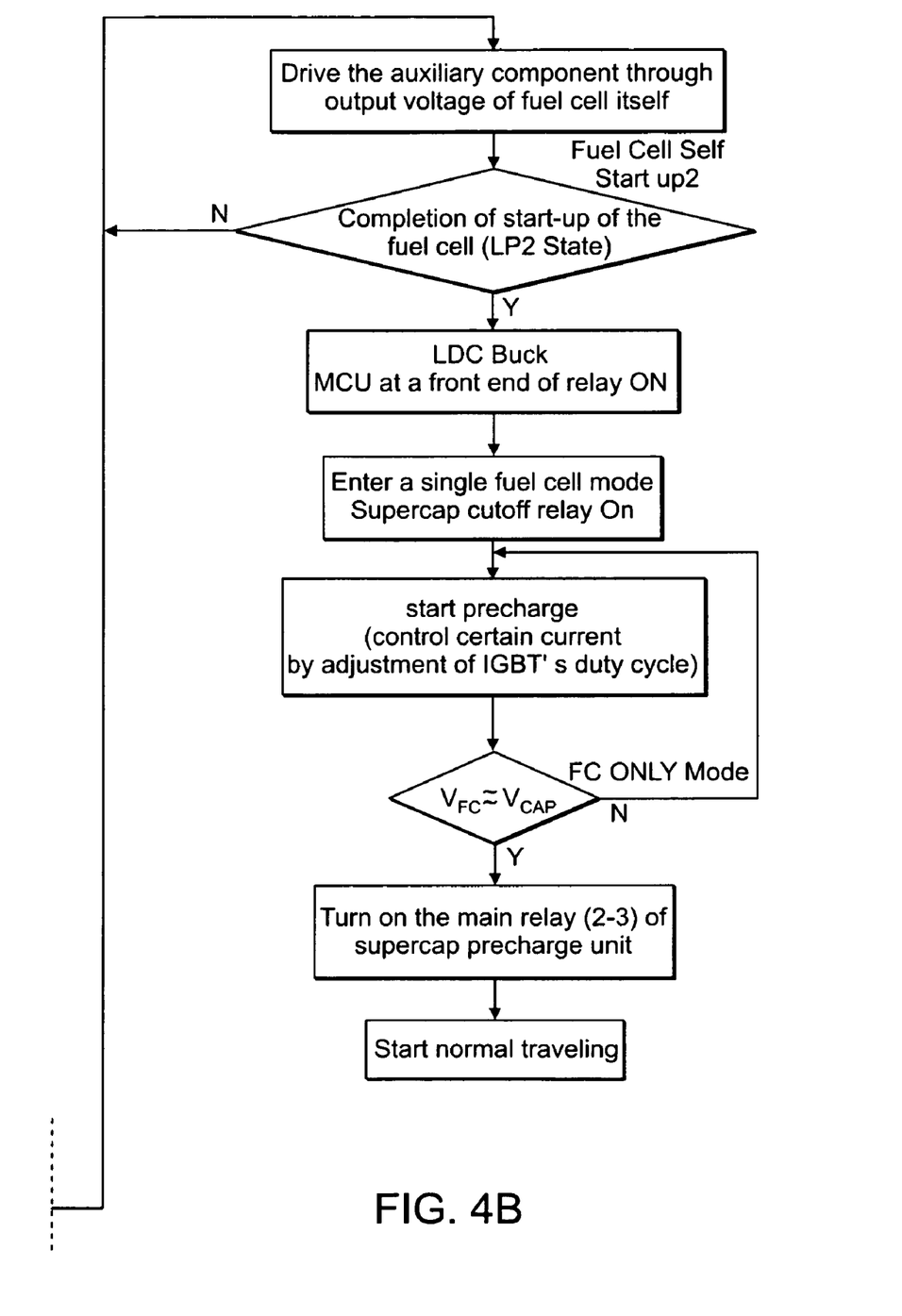

FIG. 4 is a flow chart showing the startup sequence of a fuel cell-super capacitor hybrid vehicle according to an embodiment of the present invention.

According the present invention, while the fuel cell is started through the voltage boost of the low-voltage power converter 12 (LPC), it can be started using the super capacitor in case where the auxiliary battery 13 is abnormal or a great amount of initial start energy is required such as cold start.

The voltage of the super capacitor 11 needs a delicate control process since it is a power source the energy of which is changed sharply depending on the circumstances.

As shown in FIG. 4, it is first determined whether or not the auxiliary battery 13 is in a low state where its voltage is less than a reference voltage or in a cold start state, i.e., a condition where the start-up time is expected to be extended. If it is determined that the auxiliary battery 13 is in a low state or in a cold start state, after the voltage $V_{LPC\_REF}$ of a main bus terminal is matched to the voltage of the super capacitor 11 through the voltage boost of the LPC, the supercap cutoff relay 21 and the main relay 19 of the supercap precharge unit 16 are turned on to turn the LPC 12 off, and the fuel cell auxiliary component 14 is driven using the super capacitor 11 to boost a fuel cell voltage $V_{FC}$.

A voltage $V_{LP1}$ refers to the higher one of the fuel cell voltage $V_{FC}$ having a level enough to use the power of the auxiliary component 14 from the fuel cell and a minimum voltage needed to drive the auxiliary component 14, and may be changed depending on the circumstances.

In this case, when the voltage $V_{CAP}$ of the super capacitor is lower than or equal to $V_{LP1}$, the voltage $V_{LPC\_REF}$ of the main bus terminal is matched to $V_{LP1}$ through the voltage boost of the LPC. At this time, it is determined whether the fuel cell voltage $V_{FC}$ is higher than or equal to $V_{LP1}$. If it is determined that the fuel cell voltage $V_{FC}$ is higher than or equal to $V_{LP1}$, the LPC 12 and the main relay 19 are turned off.

On the other hand, if it is determined that the auxiliary battery 13 is in a high state where its voltage is higher than the reference voltage or is not in a cold start state, the voltage $V_{LPC\_REF}$ of the main bus terminal is matched to $V_{LP1}$ through the voltage boost of the LPC and then the auxiliary component 14 is driven using the auxiliary battery 13 to thereby boost the fuel cell voltage $V_{FC}$. At this time, the fuel cell voltage $V_{FC}$ is higher than or equal to $V_{LP1}$, the LPC 12 is turned off to prevent an excessive increase of an output voltage from the fuel cell.

In this manner, the fuel cell is started through the discharge of the super capacitor or the voltage boost of the LPC, so that if the fuel cell voltage $V_{FC}$ is higher than or equal to $V_{LP1}$, the connection between the LPC 12 and the super capacitor 11 is released, i.e., the super capacitor is prevented from being charged and then the auxiliary component 14 is driven using the output voltage of the fuel cell stack 10 itself.

In addition, after the completion of the start-up of the fuel cell (LP2 state), the auxiliary battery is charged to a low-voltage level through the LPC buck and, the relay 17 installed at a front end of the MCU 22 is switched on to prepare the driving of the vehicle to thereby enter a single fuel cell mode. Then, the supercap cutoff relay 21 is turned on.

The vehicle performs a precharge operation using the super capacitor 11 while being driven in the single fuel cell mode. In other words, the fuel cell is charged to a certain voltage level through the adjustment of the duty cycle of the IGBT 20 prior to the switching on of the main relay 19 of the supercap precharge unit 16. At this time, the fuel cell is protected through limitation of current. When the fuel cell voltage $V_{FC}$ is substantially equal to the super capacitor voltage $V_{CAP}$, the charge of the fuel cell is completed. Thereafter, the main relay 19 is switched on to enter an HEV mode.

As described above, according to a startup sequence control method of fuel cell-super capacitor hybrid electric vehicles of the present invention, a super capacitor and a low-voltage auxiliary battery is selectively used at the time of starting a fuel cell, the voltage of the super capacitor is boosted using a supercap precharge unit after completion of the start-up of the fuel cell, thereby enabling a smooth start-up of the vehicle under various conditions.

In case where instant increase of power is not necessary, the supercap can be substituted with a normal battery, namely, the system may comprise a first battery (substitution of the supercap) and a second battery (auxiliary battery).

The invention has been described in detain with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A startup sequence control method of a fuel cell-super capacitor hybrid electric vehicle, comprising the steps of:
   determining whether a low-voltage auxiliary battery is in a state where its voltage is less than a reference voltage or in a cold start condition after a key-on signal has been input;
   matching, when the low-voltage auxiliary battery is in a state where its voltage is less than a reference voltage or in a cold start condition, the voltage of a main bus terminal to the voltage of an auxiliary power source through the voltage boost of a power converter;
   turning on a relay for cutting off the voltage of the auxiliary power source and a main relay of a precharge unit for the auxiliary power source; and
   turning off the power converter and then driving a fuel cell auxiliary component using the auxiliary power source to thereby boost a fuel cell voltage.

2. The startup sequence control method of claim 1, wherein the step of driving the fuel cell auxiliary component using the auxiliary power source further comprises the steps of:
   determining whether the voltage of the auxiliary power source is lower than or equal to a higher one ($V_{LP1}$) of the fuel cell voltage $V_{FC}$ having a level enough to use the power of the auxiliary component from the fuel cell and a minimum voltage needed to drive the auxiliary component;

matching, when the voltage of the auxiliary power source is not lower than or equal to the voltage $V_{LP1}$, the voltage of the main bus terminal to the voltage $V_{LP1}$ through the voltage boost of the power converter; and turning off, if the fuel cell voltage is higher than or equal to the voltage $V_{LP1}$, the power converter and the main relay.

3. The startup sequence control method of claim 2, further comprising the step of, when the fuel cell voltage is higher than or equal to $V_{LP1}$, releasing the connection between the power converter and the auxiliary power source and then driving the fuel cell auxiliary component using the output voltage of the fuel cell itself.

4. The startup sequence control method of claim 3, further comprising the steps of:

charging the auxiliary battery through a buck of the power converter after the completion of the start-up of the fuel cell;

switching on the relay installed at a front end of a motor control unit (MCU) to prepare for the driving of the vehicle;

entering a single fuel cell mode and charging the fuel cell to a certain voltage level through the adjustment of the duty cycle of an insulated gate bipolar transistor (IGBT) prior to the switching on of the main relay for interconnecting the fuel cell and the auxiliary power source in order to perform a precharge operation using the auxiliary power source while driving the vehicle in the single fuel cell mode;

determining whether the voltage of the fuel cell and the voltage of the auxiliary power source are equal to each other; and switching, when the voltage of the fuel cell and the voltage of the auxiliary power source are equal to each other, on the main relay of the precharge unit.

5. The startup sequence control method of claim 1, further comprising the steps of:

matching, when it is determined that the auxiliary battery is not in a state where its voltage is lower than a reference voltage or is not in a cold start condition, the voltage of the main bus terminal to $V_{LP1}$ through the voltage boost of the power converter;

driving the fuel cell auxiliary component using the auxiliary battery to thereby boost the fuel cell voltage;

turning off, when the fuel cell voltage is higher than or equal to $V_{LP1}$, the power converter.

6. The startup sequence control method of claim 5, further comprising the step of, when the fuel cell voltage is higher than or equal to $V_{LP1}$, releasing the connection between the power converter and the auxiliary power source and then driving the fuel cell auxiliary component using the output voltage of the fuel cell itself.

7. The startup sequence control method of claim 6, further comprising the steps of:

charging the auxiliary battery through a buck of the power converter after the completion of the start-up of the fuel cell;

switching on the relay installed at a front end of a motor control unit (MCU) to prepare for the driving of the vehicle;

entering a single fuel cell mode and charging the fuel cell to a certain voltage level through the adjustment of the duty cycle of an insulated gate bipolar transistor (IGBT) prior to the switching on of the main relay for interconnecting the fuel cell and the auxiliary power source in order to perform a precharge operation using the auxiliary power source while driving the vehicle in the single fuel cell mode;

determining whether the voltage of the fuel cell and the voltage of the auxiliary power source are equal to each other; and switching, when the voltage of the fuel cell and the voltage of the auxiliary power source are equal to each other, on the main relay of the precharge unit.

* * * * *